(12) United States Patent
Kim et al.

(10) Patent No.: US 10,417,514 B2
(45) Date of Patent: *Sep. 17, 2019

(54) APPARATUS AND METHOD FOR REPRODUCING HANDWRITTEN MESSAGE BY USING HANDWRITING DATA

(71) Applicant: Samsung Electronics Co., Ltd., Gyeonggi-do (KR)

(72) Inventors: Do-Hyeon Kim, Gyeonggi-do (KR); Mu-Sik Kwon, Seoul (KR); Sang-Wook Oh, Gyeonggi-do (KR); Seong-Taek Hwang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/810,752

(22) Filed: Nov. 13, 2017

(65) Prior Publication Data

US 2018/0068197 A1     Mar. 8, 2018

Related U.S. Application Data

(63) Continuation of application No. 15/053,597, filed on Feb. 25, 2016, now Pat. No. 9,818,036, which is a
(Continued)

(30) Foreign Application Priority Data

Nov. 6, 2009    (KR) .................. 10-2009-0107220

(51) Int. Cl.
*G06K 9/22*    (2006.01)
*H04M 1/725*    (2006.01)
(Continued)

(52) U.S. Cl.
CPC ......... *G06K 9/222* (2013.01); *G06F 3/03545* (2013.01); *G06F 3/0416* (2013.01);
(Continued)

(58) Field of Classification Search
CPC .............. G06F 3/0488; G06F 3/04883; G06F 3/04886; G06F 21/36; G06F 3/0416;
(Continued)

(56) References Cited

U.S. PATENT DOCUMENTS 6,724,918 B1    4/2004    Yen et al.
7,120,320 B2    10/2006    Petterson et al.
(Continued)

FOREIGN PATENT DOCUMENTS

CN    87104862    1/1988
CN    1729679    2/2006
(Continued)

OTHER PUBLICATIONS

Korean Office Action dated Mar. 21, 2016 issued in counterpart application No. 10-2012-0044593, 6 pages.
(Continued)

*Primary Examiner* — George Eng
*Assistant Examiner* — Jing Gao
(74) *Attorney, Agent, or Firm* — The Farrell Law Firm, P.C.

(57) ABSTRACT

A method including generating position information and time information of a handwriting inputted on a device; generating pixel values of an image capturing the handwriting; generating an image file for facilitating a sequential reproduction of the handwriting by storing the position information and the time information of the handwriting in a first field of the image file and storing the pixel values in a second field of the image file; and transmitting the generated image file to another device.

12 Claims, 10 Drawing Sheets

Related U.S. Application Data continuation of application No. 12/879,283, filed on Sep. 10, 2010, now Pat. No. 9,288,302.

(51) Int. Cl.
*G06F 3/0354* (2013.01)
*G06F 3/041* (2006.01)
*H04L 12/58* (2006.01)

(52) U.S. Cl.
CPC ...... *H04L 51/066* (2013.01); *H04M 1/72552* (2013.01); *H04L 51/02* (2013.01); *H04L 51/38* (2013.01); *H04M 2250/22* (2013.01)

(58) Field of Classification Search
CPC .... G06F 3/0484; G06F 3/017; G06F 3/04845; G06F 17/30247; G06F 21/31; G06F 21/32; G06F 3/044; G06F 1/203; G06F 21/6209; G06F 21/6245; H04M 2250/22; H04M 1/72583; H04M 1/72547; H04M 1/72569; H04W 12/08; H04W 12/02; G06K 9/4604; G06K 9/0061

See application file for complete search history.

(56) References Cited

U.S. PATENT DOCUMENTS

| | | | |
|---|---|---|---|
| 7,224,991 B1 | 5/2007 | Fuoss et al. | |
| 7,869,655 B2 | 1/2011 | Clary et al. | |
| 9,818,036 B2 * | 11/2017 | Kim | H04M 1/72552 |
| 2002/0010006 A1 | 1/2002 | Wang | |
| 2003/0195976 A1 * | 10/2003 | Shiigi | G06Q 10/107 |
| | | | 709/230 |
| 2006/0148527 A1 | 7/2006 | Blount | |
| 2008/0233986 A1 | 9/2008 | Abdelazlm | |
| 2010/0007774 A1 | 1/2010 | Imamura | |
| 2010/0033742 A1 | 2/2010 | Hanawa | |
| 2012/0083295 A1 | 4/2012 | Abdelazlm | |

FOREIGN PATENT DOCUMENTS

| | | | | |
|---|---|---|---|---|
| CN | 1981305 | | 6/2007 | |
| CN | 101352015 | | 1/2009 | |
| CN | 101478731 | | 7/2009 | |
| KR | 1020050092979 | | 9/2005 | |
| KR | 1020060013885 | | 2/2006 | |
| KR | 100736249 | | 6/2007 | |
| KR | 1020070066661 | * | 6/2007 | ............. H04Q 7/20 |
| KR | 1020070087318 | | 8/2007 | |
| KR | 100790960 | | 12/2007 | |
| KR | 100800458 | | 1/2008 | |
| KR | 1020080039606 | | 5/2008 | |
| WO | WO 2004/056083 | | 7/2004 | |

OTHER PUBLICATIONS

Chinese Office Action dated Oct. 24, 2018 issued in counterpart application No. 201610414463.1, 23 pages.

* cited by examiner

| | | |
|---|---|---|
| WRITING DATA HEADER | 0x☐☐☐☐☐☐ | |
| DECODING INFORMATION | VERSION INFORMATION | RESERVED |
| 1st STROKE START | 0xFF000000 | |
| 1st STROKE ATTRIBUTE TAG | 0xFF☐☐ | 0x☐☐☐☐ |
| | ... | ... |
| | 0xFF☐☐ | 0x☐☐☐☐ |
| 1st STROKE POINT (x,y) | 0x☐☐☐☐ | 0x☐☐☐☐ |
| | ... | ... |
| | 0x☐☐☐☐ | 0x☐☐☐☐ — 1st POINT |
| 2nd STROKE START | 0xFF000000 | |
| 2nd STROKE ATTRIBUTE TAG | 0xFF☐☐ | 0x☐☐☐☐ |
| | ... | ... |
| | 0xFF☐☐ | 0x☐☐☐☐ |
| 2nd STROKE POINT (x,y) | 0x☐☐☐☐ | 0x☐☐☐☐ |
| | ... | ... |
| | 0x☐☐☐☐ | 0x☐☐☐☐ — 2nd POINT |
| ... | ... | |
| Mth STROKE START | 0xFF000000 | |
| Mth STROKE ATTRIBUTE TAG | 0xFF☐☐ | 0x☐☐☐☐ |
| | ... | ... |
| | 0xFF☐☐ | 0x☐☐☐☐ |
| Mth STROKE POINT (x,y) | 0x☐☐☐☐ | 0x☐☐☐☐ |
| | ... | ... |
| | 0x☐☐☐☐ | 0x☐☐☐☐ — Nth POINT |
| DATA END | 0xFFFFFFFF | |

FIG.9

APPARATUS AND METHOD FOR REPRODUCING HANDWRITTEN MESSAGE BY USING HANDWRITING DATA

PRIORITY

This application is a Continuation Application of, and claims priority under 35 U.S.C. § 120 to, U.S. patent application Ser. No. 15/053,597, which was filed on Feb. 25, 2016, issued on Nov. 14, 2017 as U.S. Pat. No. 9,818,036, and was a Continuation Application of, and claimed priority under 35 U.S.C. § 120 to, U.S. patent application Ser. No. 12/879,283, which was filed on Sep. 10, 2010, issued on Mar. 15, 2016 as U.S. Pat. No. 9,288,302, and claimed priority under 35 U.S.C. § 119(a) to a Korean Patent Application filed in the Korean Intellectual Property Office on Nov. 6, 2009 and assigned Serial No. 10-2009-0107220, the entire disclosures of each of which are incorporated herein by reference.

BACKGROUND OF THE INVENTION

1. Field of the Invention

The present invention relates generally to reproduction of a handwritten message and, more particularly, to an apparatus and method for sequentially reproducing a handwritten message using handwriting data containing position information and time information of the handwritten message.

2. Description of the Related Art

With the development of various technologies including wired and wireless communication techniques, multimedia techniques, manufacturing techniques for hardware like a Central Processing Unit (CPU) and associated memory, power charging techniques, and so forth, functions of mobile terminals are increasingly emphasized. For example, a mobile terminal conventionally transmits necessary data to a communication partner through voice communication. However, after transmission and reception of a text message become possible, desired data can be transmitted to the partner using a Short Message Service (SMS) including simple text data in a situation where voice communication is not allowed or simple data needs to be transmitted.

The SMS has evolved into a Long Message Service (LMS) for long text data and a Multimedia Message Service (MMS) for multimedia files such as still or moving images, through which users can be provided with various benefits. In particular, the MMS which transmits a multimedia file, unlike the SMS or the LMS which merely transmits text data, has been in increasing demand from users due to extensibility in expression. The following describes a method for transmitting desired data by using the MMS.

Referring to FIG. 1, a user may create a conventional MMS message by inputting desired characters or attaching a desired image to a handwriting recognition region. In an MMS input screen shown in FIG. 1, the handwriting recognition region includes three single recognition regions, in each of which a single character is recognized at a time. Character information desired by the user is input by a finger or an input device such as a stylus pen. By using a file attachment box positioned below a character input window, an image stored in a memory may be retrieved for transmission.

However, conventional MMS transmits data including a previously stored image. When a transmitting side desires to transmit handwriting data by using the MMS, the handwriting data has to be converted into an image file by using a separate program, and then must be stored and transmitted. Since the handwriting data is converted into a still image, information about the time when the user performed the handwriting is not included in the still image.

In other words, when a receiving side receives an image included in the MMS message, the image looks like a single still image and the handwriting data cannot be sequentially reproduced in the same order in which the handwritten data was created. As a result, the handwriting or sensibility of the transmitting side cannot be contemporaneously delivered in a sequential manner, thereby eliminating the feeling of progressive data entry.

SUMMARY OF THE INVENTION

An aspect of the present invention is to address at least the above problems and/or disadvantages and to provide at least the advantages described below. Accordingly, an aspect of the present invention is to provide an apparatus and method for sequentially reproducing a handwritten message to a receiving side using handwriting data including position information and time information of the handwritten message.

According to an aspect of the present invention, there is provided a method including generating position information and time information of a handwriting inputted on a device; generating pixel values of an image capturing the handwriting; generating an image file for facilitating a sequential reproduction of the handwriting by storing the position information and the time information of the handwriting in a first field of the image file and storing the pixel values in a second field of the image file; and transmitting the generated image file to another device.

According to another aspect of the present invention, there is provided a method including receiving an image file including a first field storing position information and time information of a handwriting and a second field storing pixel values of an image capturing the handwriting; and reproducing the handwriting on a display screen sequentially based on the image file.

BRIEF DESCRIPTION OF THE DRAWINGS

The above and other features and advantages of an embodiment of the present invention will be more apparent from the following detailed description taken in conjunction with the accompanying drawings, in which:

FIG. 9 is a structural diagram illustrating an internal structure of point sequence data according to an embodiment of the present invention.

DETAILED DESCRIPTION OF THE PREFERRED EMBODIMENTS

Hereinafter, preferred embodiments of the present invention are described in detail with reference to the accompanying drawings. In the following description, details such as components are provided, but they are provided to assist a comprehensive understanding of the present invention. Accordingly, those of ordinary skill in the art will recognize that various changes and modifications of the details can be made without departing from the scope of the invention.

Figure 1:
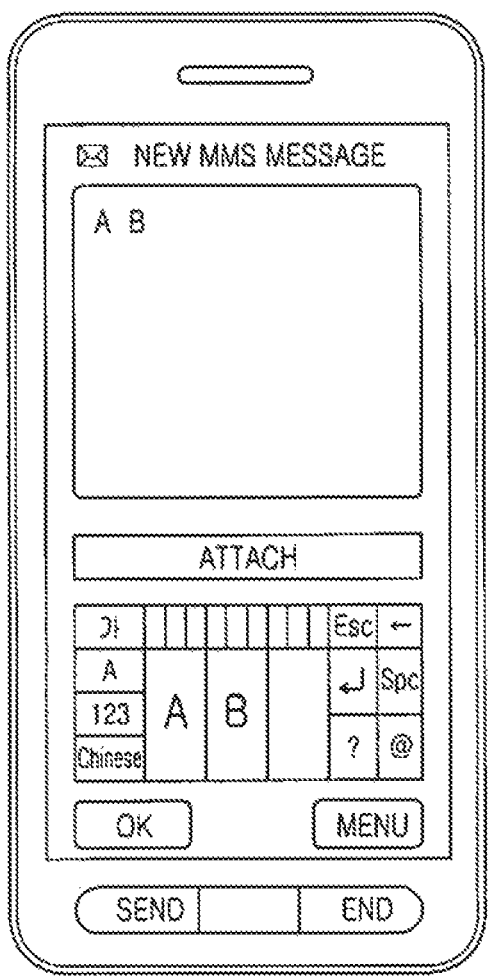
FIG. 1 illustrates information transmission using a conventional Multimedia Message Service (MMS)
Figure 2:
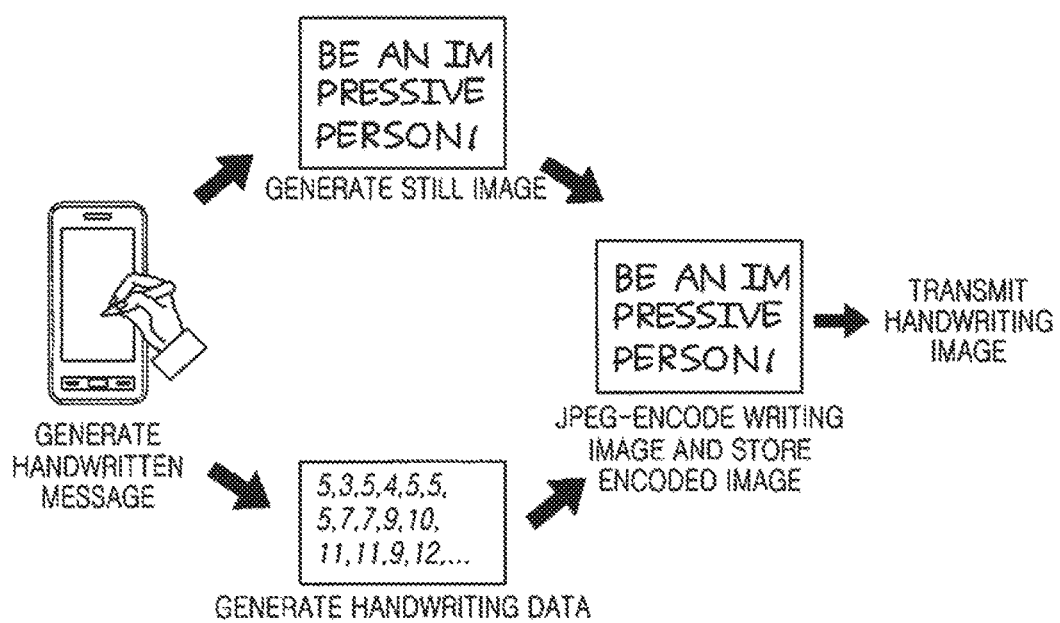
FIG. 2 illustrates a process of generating a handwritten message according to an embodiment of the present invention.

FIG. 2 is a diagram illustrating a process of generating a handwritten message according to an embodiment of the present invention.

Referring to FIG. 2, a transmitting-side user generates a handwritten message using a finger or an input device such as a stylus pen on a mobile terminal. The mobile terminal generates handwriting data including position information and time information regarding one or more points forming the handwritten message, and also generates a still image using the position information of the handwriting data.

The still image includes a plurality of fields, one of which stores pixel values acquired by imaging the handwritten message. These pixel values are defined as still image data which does not include time information or position information regarding one or more points forming the handwritten message. The handwriting data is included in one of the plurality of fields of the still image and is compressed.

In the present invention, an image where handwriting data is stored in a particular field of the still image including the still image data is defined as a handwriting image. The handwriting image is then compressed in a format such as Joint Photographic Coding Experts Group (JPEG) and the compressed handwriting image is transmitted to the receiving side.

Figure 3:
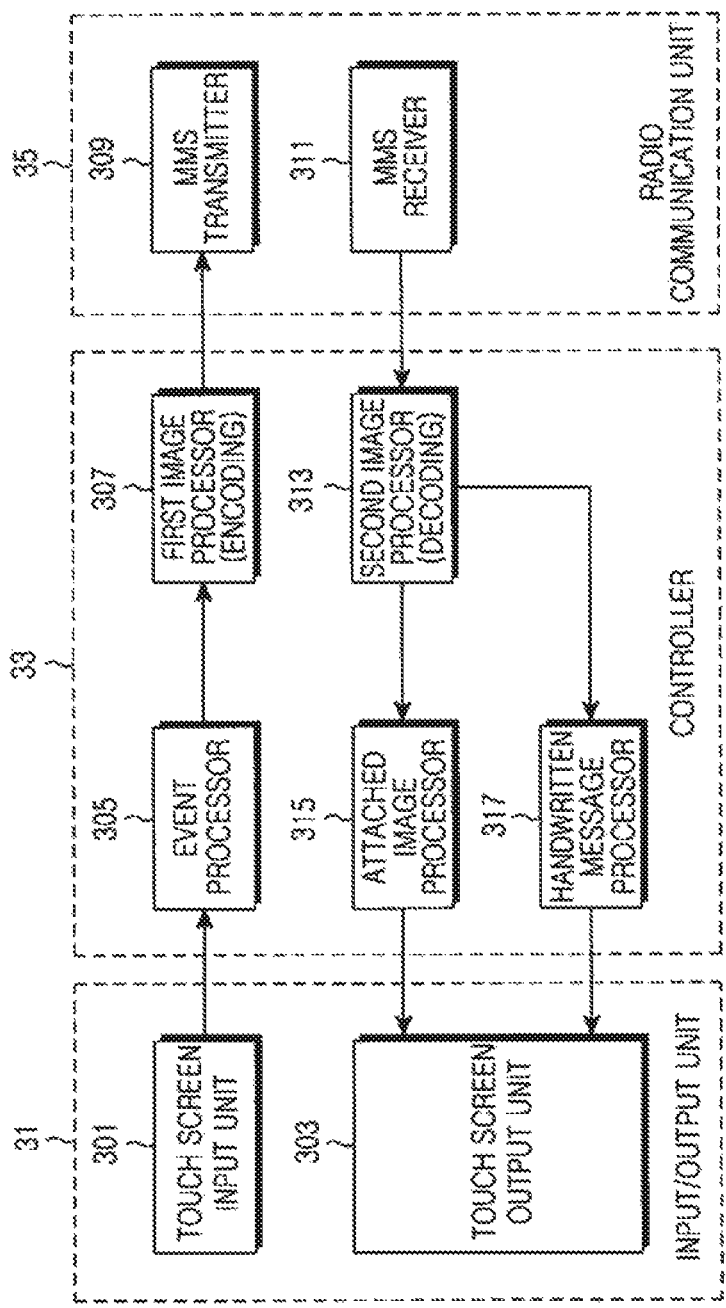
FIG. 3 is a block diagram of a mobile terminal for transmitting and receiving a handwritten message according to an embodiment of the present invention.

The internal structure of the mobile terminal which executes the process shown in FIG. 2 is shown in FIG. 3. FIG. 3 shows internal components of the mobile terminal for transmitting and receiving a handwriting image according to an embodiment of the present invention. Referring to FIG. 3, the mobile terminal includes an input/output unit 31, a controller 33, and a radio communication unit 35. The input/output unit 31 includes a touch screen input unit 301 and a touch screen output unit 303. The controller 33 includes an event processor 305, a first image processor 307, a second image processor 313, an attached image processor 315, and a handwritten message processor 317. The radio communication unit 35 includes a Multimedia Message Service (MMS) transmitter 309 and an MMS receiver 311.

The input/output unit 31 receives an input of a handwritten message from a user and reproduces a handwriting image received from the controller 33. More specifically, in the input/output unit 31, the touch screen input unit 301 receives the input of the handwritten message from the user and the touch screen output unit 303 reproduces the handwriting image. The input/output unit 31 transmits the received handwritten message to the controller 33.

The controller 33 interprets the handwritten message received from the input/output unit 31 to generate handwriting data including position information and time information, and generates a still image using the position information of the generated handwriting data. The still image includes a plurality of fields, one of which stores still image data including pixel values acquired by imaging the handwritten message. These pixel values simply express the handwritten message and do not include position information or time information regarding one or more points forming the handwritten message.

The controller 33 encodes the handwriting data included in a particular field of the still image and transmits the encoded handwriting data to the radio communication unit 35, detects handwriting data included in the handwriting image received from the radio communication unit 35, and transmits the detected handwriting data to the input/output unit 31.

More specifically, the event processor 305 of the controller 33 interprets the handwritten message received from the input/output unit 31 to generate the handwriting data including the position information and the time information of one or more points forming the handwritten message and generates the still image using the position information. The still image includes a plurality of fields, one of which stores still image data that are pixel values acquired by imaging the handwritten message. The still image data does not include the position information and the time information of one or more points forming the handwritten message. The event processor 305 transmits the handwriting image including the handwriting data in the particular field of the still image to the first image processor 307.

The handwriting data is stored in a field other than the field where the still image data is stored. If the handwritten message has been generated on a particular image as a background, the still image data includes pixel values of the particular image where the handwritten message is included.

The first image processor 307 encodes the handwritten message for transmission.

The second image processor 313 decodes an image received from the radio communication unit 35. If the image does not include the handwriting data as a result of decoding and interpretation thereof, the second image processor 313 determines the received image as a general attached image which does not include the handwritten message and transmits the image to the attached image processor 315. If the image includes the handwriting data, the second image processor 313 determines the image as a handwriting image and transmits the image to the handwritten message processor 317.

The attached image processor 315, upon receiving the image having no handwriting data, transmits the received image to the touch screen output unit 303, such that the received image can be output on the screen. The handwritten message processor 317 processes the handwritten message to allow sequential reproduction of the handwritten message using time information and position information of the handwriting data included in the handwritten message. The handwritten message processor 317 then transmits the processed handwritten message to the touch screen output unit 303.

The radio communication unit 35 transmits and receives various images including the handwriting image. More specifically, the MMS transmitter 309 transmits images and the MMS receiver 311 receives images.

Figure 4:
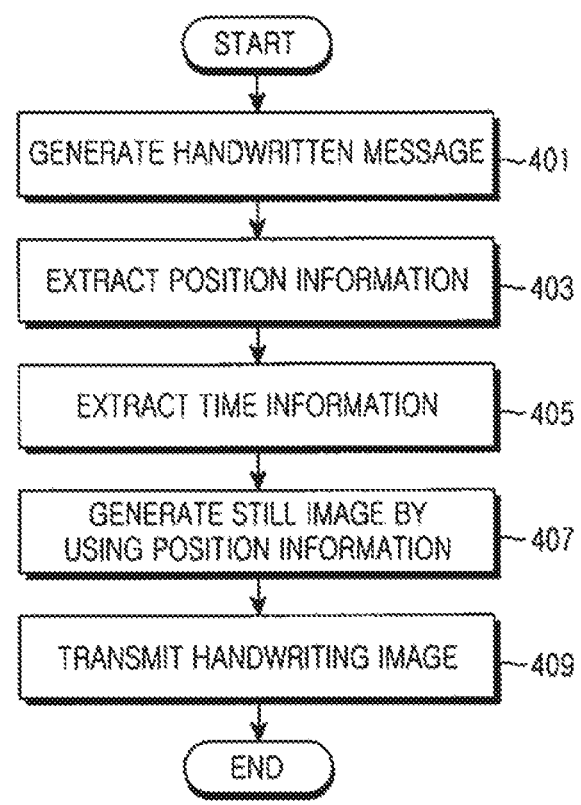
FIG. 4 is a flowchart illustrating a process of generating a handwriting image including handwriting data according to an embodiment of the present invention.

FIG. 4 is a flowchart illustrating a process of generating a handwriting image including handwriting data according to an embodiment of the present invention.

Referring to FIG. 4, in step 401, a transmitting-side user generates a handwritten message using a mobile terminal. The handwritten message is input using a finger or an input device such as a stylus pen via touch screen input unit 301.

The transmitting-side user may generate the handwritten message on an empty space or on a particular image as a background image.

In step 403, the touch screen input unit 301 transmits the input handwritten message to the event processor 305, which then analyzes the received handwritten message to extract position information from the handwritten message. In step 405, the event processor 305 extracts time information from the received handwritten message to generate handwriting data including the extracted position information and the extracted time information. The generated handwriting data includes position information and time information regarding one or more points forming the handwritten message.

In step 407, the event processor 305 generates a still image using the position information and transmits a handwriting image where the handwriting data is included in a particular field of the still image to the first image processor 307. The first image processor 307 encodes the handwriting image. The handwriting data is stored in any one field other than the particular field which stores still image data. The particular field may be an image header field, or the handwriting data may be included in a separate field generated at the rear of one or more fields forming the still image. In step 409, the encoded handwriting image is transmitted to the MMS transmitter 309 and then to a receiving-side mobile terminal.

Figure 5:
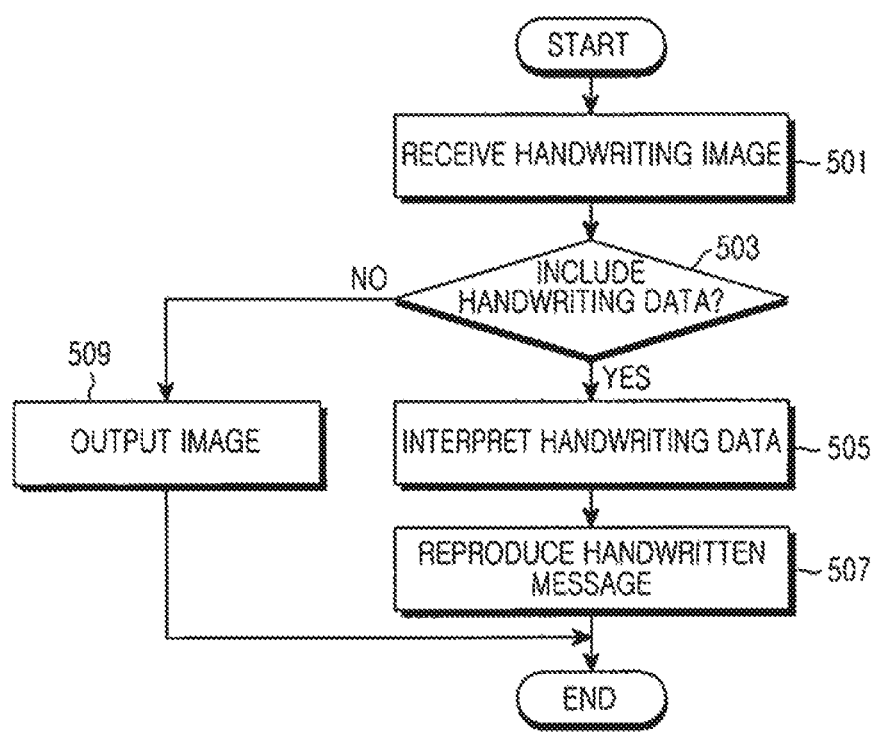
FIG. 5 is a flowchart illustrating a process of reproducing a handwriting image including handwriting data according to an embodiment of the present invention.

FIG. 5 is a flowchart illustrating a process of reproducing a handwriting image including handwriting data according to an embodiment of the present invention.

Referring to FIG. 5, in step 501, a mobile terminal receives an image from a transmitting-side mobile terminal through the MMS receiver 311. The MMS receiver 311 transmits the received image to the second image processor 313. In step 503, the second image processor 313 decodes the received image to check if the received image includes handwriting data stored in one of a plurality of fields that form the image.

If the received image is a general attached image which does not include the handwriting image, the received image is output through the attached image processor 315 and the touch screen output unit 303 in step 509. If the received image is the handwriting image including the handwriting data, the second image processor 313 transmits the decoded handwriting image to the handwritten message processor 317 in step 505. In step 507, the handwritten message processor 317 processes the received handwriting image to allow sequential reproduction of the handwritten message using time information and position information of the handwriting data included in the handwriting image. The handwritten message processor 317 then transmits the processed image to the touch screen output unit 303, which then sequentially reproduces the handwritten message.

The handwriting data is included in one of a plurality of fields forming a still image. However, if the handwriting data is stored in the field which stores still image data, the still image data may be damaged during a storage process. Therefore, the handwriting data is stored in a field other than the field which stores the still image data, as will be described in detail below.

Figure 6:
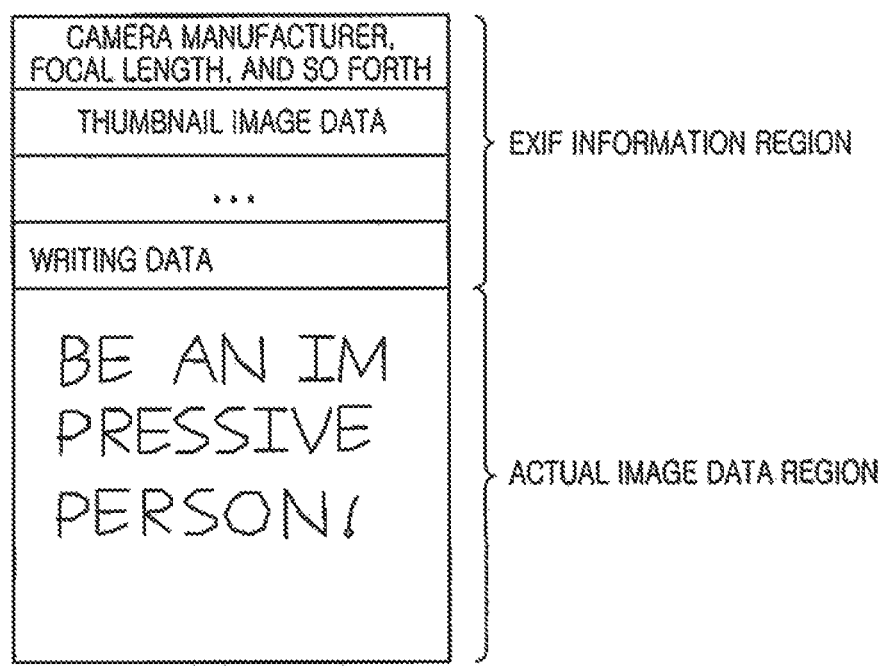
FIGS. 6 through 8 are diagrams illustrating a field where handwriting data is stored according to an embodiment of the present invention.
Figure 7:
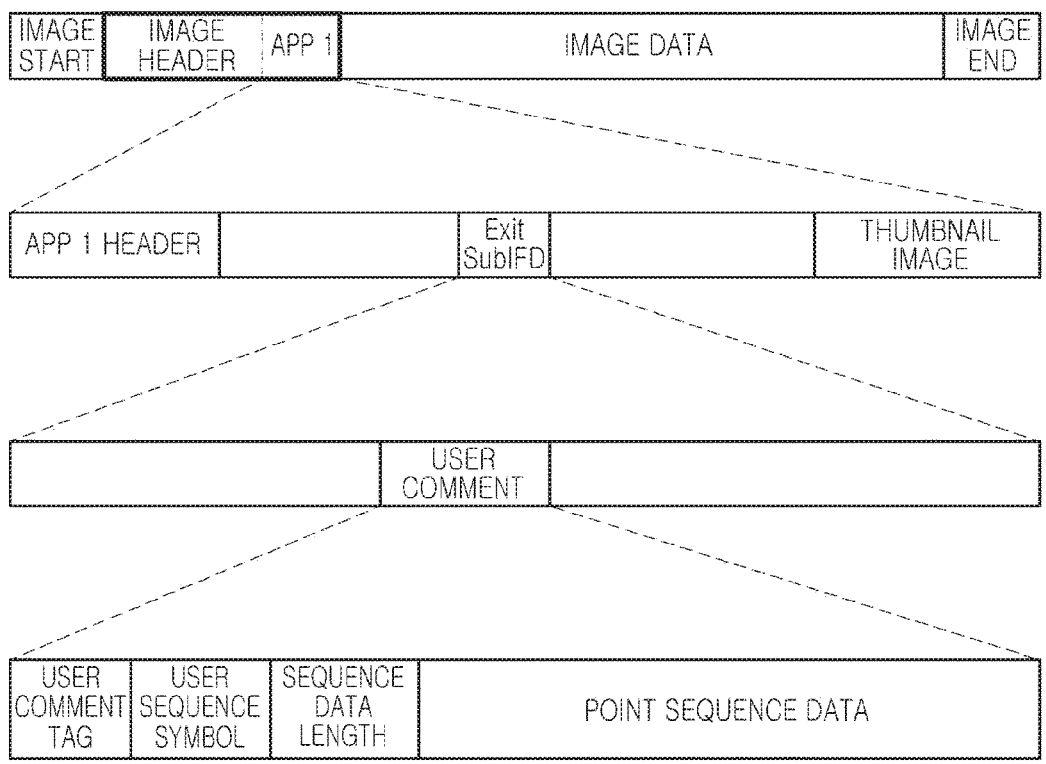
Figure 8:
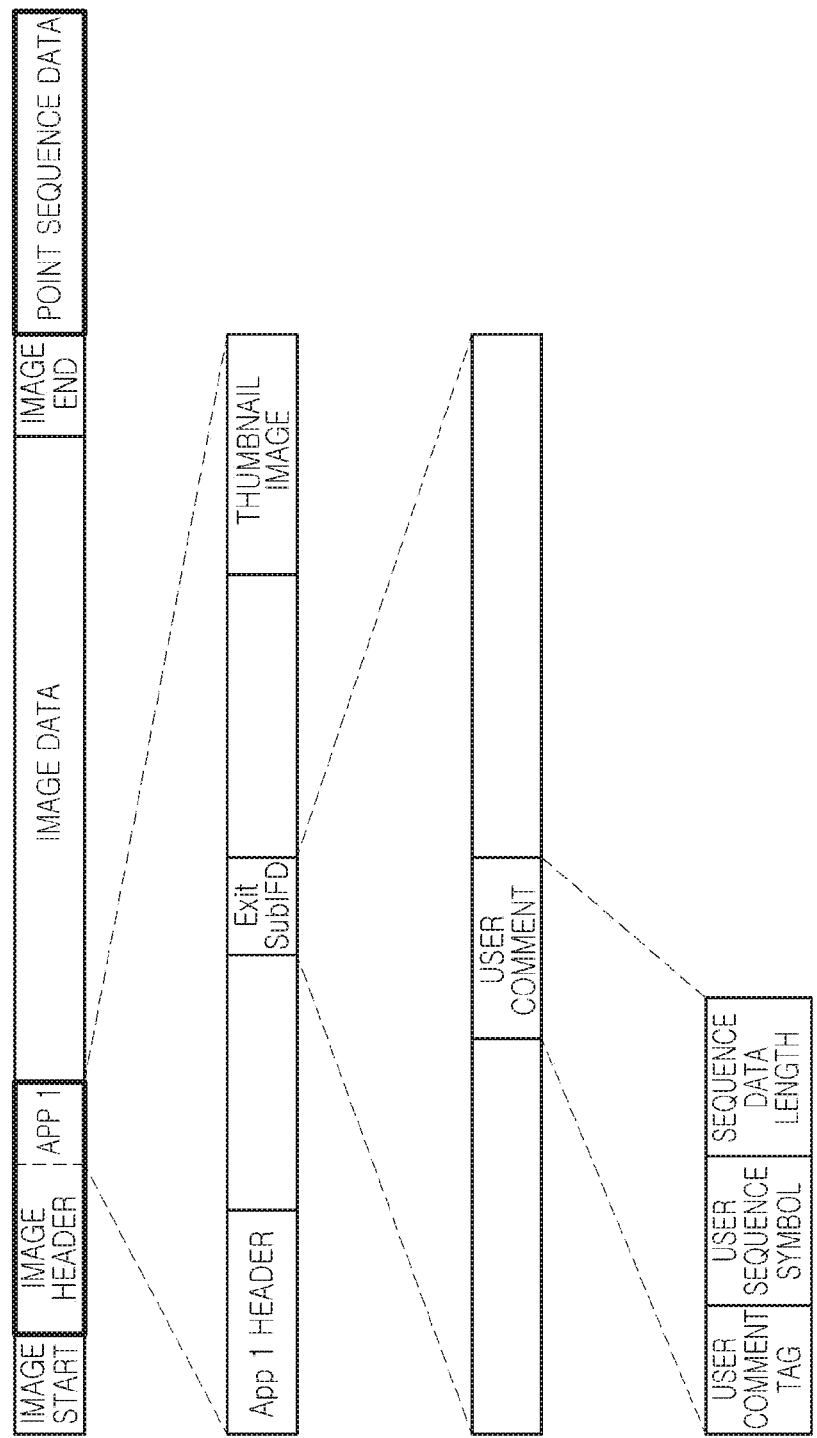

FIGS. 6 through 8 are diagrams for describing a field where handwriting data is stored according to an embodiment of the present invention. FIGS. 6 through 8, it is assumed that a single handwriting image includes a plurality of fields roughly divided into an image start field, an image header field, an image data field, and an image end field. FIG. 6 schematically illustrates an Exchangeable Image File Format (EXIF) information field where handwriting data is stored, FIG. 7 illustrates in detail handwriting data stored in an image header field, and FIG. 8 illustrates in detail handwriting data stored in a field other than the image header field.

Referring to FIG. 6, the handwriting data is stored in the EXIF information field and still image data is stored in the image data field. The EXIF information field, which may be included in the image header field, stores various information of the handwriting image, and is not displayed on the output screen of the mobile terminal during reproduction of the handwritten message. The image data field contains the still image data and includes pixel values of an image acquired by imaging the handwritten message, without time information or position information.

In the present invention, a transmitting-side mobile terminal stores the handwriting data in the EXIF information field and transmits the handwriting data, and a receiving-side mobile terminal, upon receiving an image, checks if an EXIF information field of the received image stores the handwriting data, and if so, sequentially reproduces the handwritten message on the output screen, as described below.

Referring to FIG. 7, the image header field includes an application field (APP 1), which includes an application header field, an EXIF information field, and a thumbnail image field. The application header field stores configuration and information of the application field. The thumbnail image field stores a thumbnail image. The EXIF information field stores handwriting data. More specifically, the handwriting data is stored in a user comment field included in the EXIF information field. The handwriting data may include a point sequence symbol, a sequence data length, and point sequence data. The point sequence symbol means a symbol indicating handwriting image including a particular image or a symbol indicating handwriting image including no particular image. The point sequence data means handwriting data, and the sequence data length means a total length of the handwriting data. Although not shown in FIG. 7, the handwriting data may also include the color and thickness of lines used to form the handwritten message.

FIG. 8 illustrates the handwriting data stored in a field other than the image header field. Referring to FIG. 8, a portion of the handwriting data is stored in the image header field and the other portion thereof is stored in a separate field generated at the rear of the image end field. While the point sequence symbol and the sequence data length are stored in the EXIF information field and the point sequence data is stored in a separately generated space in FIG. 8, this may be changed according to user's setting. For example, any information forming the handwriting data is not stored in the image header field and all information forming the handwriting data may be stored in a separately generated space.

Referring to FIG. 9, the point sequence data is time information of coordinates of consecutively input points, and may roughly include a handwriting data header, decoding information, a stroke start, stroke attributes, a stroke point, and data end.

In FIG. 9, in the handwriting data header, the number of points forming the handwritten message or a marker character forming the handwritten message is recorded and the number of all points is also included. The decoding information includes version information and other information. The stroke start, the stroke attributes, and the stroke point can be classified for each stroke, and their sizes may change according to a total number of strokes. The data end means the end of the handwritten message. The structure shown in FIG. 9 is merely an example, and is subject to change according to the type and size of the time information.

Below is a description of the process of reproducing the handwritten message by using the handwriting data based on the structure of the mobile terminal.

Figure 10:
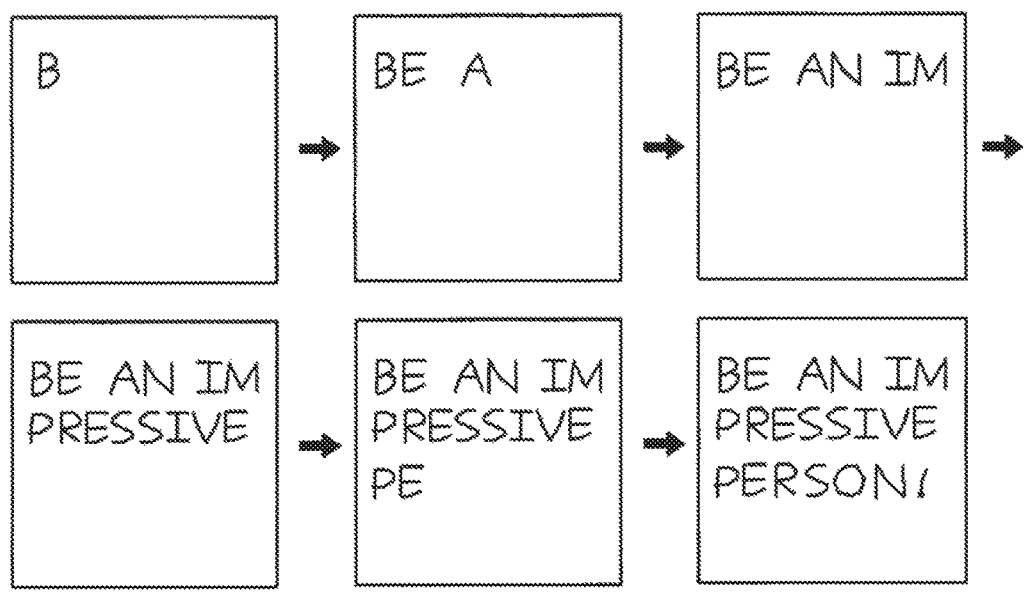
FIG. 10 is a diagram illustrating a process of sequentially reproducing a handwritten message using handwriting data according to an embodiment of the present invention.

FIG. 10 is a diagram illustrating a process of sequentially reproducing the handwritten message by using the handwriting data according to an embodiment of the present invention.

Referring to FIG. 10, the second image processor 313 of the controller 33 checks if the received image includes the handwriting data, and, if so, sequentially reproduces the handwritten message on the touch screen output unit 303 using the time information and the position information included in the handwriting data. For example, if a handwritten message "Be an impressive person!" is received, the message is sequentially reproduced on the touch screen output unit 303 by using time information and position information generated according to coordinates of points forming the handwritten message. The handwriting data is stored in a particular field of the image and is not displayed on the output screen. However, when a mobile terminal does not have a function of detecting the handwriting data included in the image, the mobile terminal cannot check the handwriting data and thus displays the image on the touch screen output unit 303.

As apparent from the foregoing description, the present invention sequentially reproduces the handwritten message by using the handwriting data including time information and position information regarding one or more points forming the handwritten message, thus allowing expression of the handwritten message carrying the sensibility of the transmitting side.

While the invention has been shown and described with reference to a certain preferred embodiment thereof, it will be understood by those skilled in the art that various changes in form and details may be made therein without departing from the spirit and scope of the invention as defined by the appended claims and equivalents thereof.

What is claimed is:

1. A method for operating a mobile device, the method comprising:
   receiving, via a touch screen of the mobile device, an input of a handwriting;
   identifying position information and time information regarding one or more points forming the handwriting;
   identifying pixel values of an image capturing the handwriting;
   generating an image file for sequentially reproducing the input of the handwriting, the image file comprising a header field including at least a portion of the position information and the time information and an image data field storing the pixel values; and
   storing the image file in a memory of the mobile device.

2. The method of claim 1, further comprising transmitting the image file to another mobile device for sequentially reproducing the handwriting at the another mobile device.

3. The method of claim 1, wherein the image file further comprises an image header field including the header field, an image start field, and an image end field.

4. The method of claim 1, wherein a remaining portion of the position information and the time information is stored in a new field.

5. The method of claim 1, wherein the position information is calculated by using coordinates of the one or more points forming the handwriting.

6. The method of claim 1, wherein the time information includes information about times at which the one or more points forming the handwriting are identified.

7. An electronic device, comprising:
   a memory;
   a touch screen; and
   a controller configured to:
      receive, via the touch screen, an input of a handwriting;
      identify position information and time information regarding one or more points forming the handwriting;
      identify pixel values of an image capturing the handwriting;
      generate an image file for sequentially reproducing the input of the handwriting, the image file comprising a header field including at least a portion of the position information and the time information and an image data field storing the pixel values; and
      store the image file in the memory.

8. The electronic device of claim 7, wherein the controller is further configured to transmit the image file to another device for sequentially reproducing the handwriting at the another device.

9. The electronic device of claim 7, wherein the image file further comprises an image header field including the header field, an image start field, and an image end field.

10. The electronic device of claim 7, wherein a remaining portion of the position information and the time information is stored in a new field.

11. The electronic device of claim 7, wherein the position information is calculated by using coordinates of the one or more points forming the handwriting.

12. The electronic device of claim 7, wherein the time information includes information about times at which the one or more points forming the handwriting are identified.

* * * * *